US007345582B2

(12) United States Patent
Gould

(10) Patent No.: US 7,345,582 B2
(45) Date of Patent: Mar. 18, 2008

(54) METHODS FOR DETECTING, COMPUTING AND DISSEMINATING LOCATION INFORMATION OF WEAPONS OF MASS DESTRUCTION

(76) Inventor: Harley Nicole Gould, 18181 NE. 31st Ct., Apt. #409, Aventura, FL (US) 33160

( * ) Notice: Subject to any disclaimer, the term of this patent is extended or adjusted under 35 U.S.C. 154(b) by 0 days.

(21) Appl. No.: 10/992,573

(22) Filed: Nov. 18, 2004

(65) Prior Publication Data

US 2008/0036585 A1    Feb. 14, 2008

Related U.S. Application Data

(60) Provisional application No. 60/523,213, filed on Nov. 19, 2003.

(51) Int. Cl.
*G08B 1/08* (2006.01)
(52) U.S. Cl. ............ 340/539.26; 342/126; 342/357.06; 455/456.1
(58) Field of Classification Search ............ 340/539.26
See application file for complete search history.

(56) References Cited

U.S. PATENT DOCUMENTS 6,084,510 A * 7/2000 Lemelson et al. ..... 340/539.13

| 6,169,476 | B1 * | 1/2001 | Flanagan ............... 340/286.02 |
| 6,608,559 | B1 * | 8/2003 | Lemelson et al. ..... 340/539.13 |
| 6,930,596 | B2 * | 8/2005 | Kulesz et al. ............... 340/506 |
| 7,049,952 | B2 * | 5/2006 | Kulesz et al. ............... 340/506 |
| 2002/0176545 | A1 * | 11/2002 | Schweitzer ................... 379/37 |
| 2003/0012460 | A1 * | 1/2003 | Zlotnick et al. ............ 382/311 |
| 2004/0006694 | A1 * | 1/2004 | Heelan et al. .............. 713/168 |
| 2005/0088299 | A1 * | 4/2005 | Bandy et al. .......... 340/539.16 |

FOREIGN PATENT DOCUMENTS

CA    2411365 A1 *  6/2004

* cited by examiner

*Primary Examiner*—George Bugg
(74) *Attorney, Agent, or Firm*—Steven M. Greenberg, Esq.; Carey, Rodriguez, Greenberg & Paul, LLP

(57) ABSTRACT

The present invention relates systems and methods to determine the location information of a signal made from a radioactive device or hazardous material. The system employs multiple radiation sensor devices, which his capable of determining the signal strength and the angle of arrival of a radioactive signal. The mobile switching center sends a request along with radiation information to a location processor, which controls devices. The location processor sets up each sensor device to track the radiation signal. If at least two devices are successful in tracking the radioactive signals and returning information about the radiation signal, then the location processor can determine the location of the radioactive device or hazardous material by using a triangulation method.

1 Claim, 5 Drawing Sheets

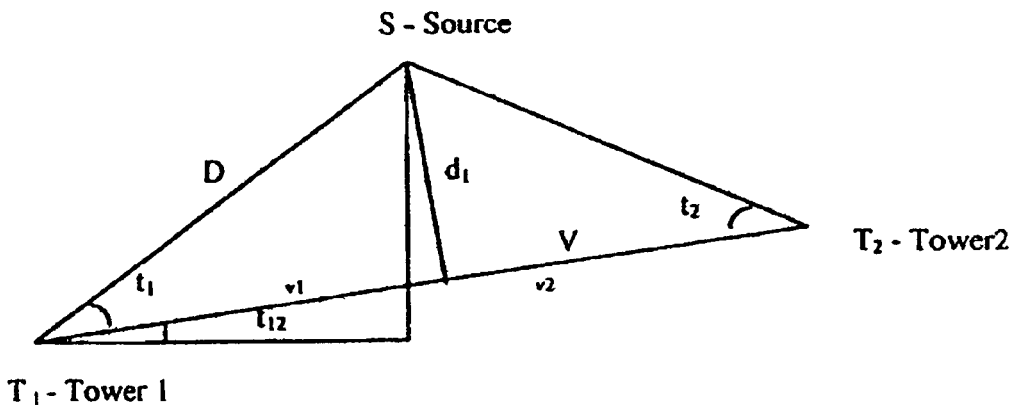

DEFINITIONS $d_1$ is the perpendicular distance from Source, S, to the vector, V, connecting $T_1$ and $T_2$
D is the derived distance from S to $T_1$
V is the length of the vector from $T_1$ to $T_2$
$v_1$ is the distance from $T_1$ to $d_1$
$t_1$ is the angle from S to $T_2$
$t_{12}$ is the angle at $T_1$ from the vector, V, to a line representing the Latitude of $T_1$
$t_2$ is the angle from S to $T_1$
V is the sum of $v_1$ and $v_2$ $$v_1 = V \, (\tan t_2) / [(\tan t_1) + (\tan t_2)] \quad \text{Equation 1}$$

$$D = v_1 / \cos t_1 \quad \text{Equation 2}$$

$$\text{Source Latitude} = T_1 \text{ Latitude} + D \sin(t_1 + t_{12}) \quad \text{Equation 3}$$

$$\text{Source Longitude} = T_1 \text{ Longitude} + D \cos(t_1 + t_{12}) \quad \text{Equation 4}$$

FIG 5

METHODS FOR DETECTING, COMPUTING AND DISSEMINATING LOCATION INFORMATION OF WEAPONS OF MASS DESTRUCTION

I claim priority to my Provisional Application for Patent Filed on Nov. 19, 2003, Ser. No. 60/523,213.

TECHNICAL FIELD

This invention is related to the field of radiological detection, particularly to nuclear weapons of mass destruction and hazardous material waste, and more particularly to locating a radioactive device within the coverage area of a radiotelephony system.

BACKGROUND OF THE INVENTION

The advent of mobile communication technology has led to the proliferation of radiotelephones (also known as wireless telephone). Now, a person can carry with them a radiotelephone anywhere they go. A person can make a telephone call from almost anywhere to another person and can also receive a telephone call from anywhere.

Radiotelephones are generally linked to the Public Switched Telephone Network (PSTN) through a network of antennas, base stations, and mobile switching centers. Each radiotelephone is in communication with at least one antenna and switches from one antenna to another when it moves from one antenna cell to another antenna cell. This "cellular" infrastructure will be utilized for my invention to transmit the sensors information through the PSTN switching centers, to the processing centers.

My technique, based upon signal (radiation) strength and trilaterialization can be employed, but they are generally effective in line-of-sight conditions, such as rural settings.

In dense urban areas, radioactive waves reflect on buildings before reaching a receiving antenna on a mobile device, and the mobile device receives radioactive signals both directly from an emitting antenna and from reflections. This phenomenon is known as multipath signals, and it is well known in the wireless telephony art. The multipath phenomenon renders most analytical location computational techniques such as time-of-arrival (TOA) or time-difference-of-arrival (TDOA) substantially useless in urban areas. Radiation (different frequencies) may have the same characteristics.

SUMMARY OF THE INVENTION

Briefly described, the present invention is a system and method for determining the geographical position of a nuclear weapon of mass destruction and hazardous radioactive material wastes within a radiotelephony system. A system according to the present invention employs multiple sensor devices in multiple wireless transmission tower sites, one or more (directional sensors mounted to each of the three faces of a cellular antenna array) devices per each transmission tower site. The devices are connected to a signal strength location processor, where the position calculations are performed. The location processor is in communication with a Mobile Switching Center (MSC).

An emitter (radiological source) is tracked by a system according to the present invention, and its position is determined by a method disclosed in the present invention. When an emitter is received by a sensor at a wireless transmission tower and sent to a base station (BS), the BS forwards the information to a mobile switching center (MSC), where it is interpreted. The MSC alerts a location processor to determine the physical location. The MSC also proceeds to forward the information to a PSAP (Public Safety Answering Point).

The location processor is a processor that controls a plurality of devices and determines the location of a radioactive signal's source. The location processor obtains the radioactive signal's information from the MSC and sends this information to the devices. Each device attempts to determine the signal strength of radioactive signals relative to the position of the device. Preferably, two or more sensor devices can determine the angles of arrival. This information is sent to the location processor.

The location processor uses the signal strength and angle of arrival information and the information on the location of sendor devices to calculate the geographical coordinates of the source of radioactive signal. The geographical coordinates calculated are then used to determine the street address of the emitter.

If more than two sensor devices detect the radioactive signal, the location processor will determine several pairs of geographical coordinates by pairing devices differently. From these pairs of geographical coordinates the location processor will select a best fit set and use it to determine the location of the source of the radioactive signal.

If only one tower sensor device detects the radioactive signal, then the angle of arrival (multiple sensors on each of the three faces at a single site) is provided to the MSC and the location processor does not calculate the location of the radioactive signal's source.

DESCRIPTION OF THE DRAWINGS

The foregoing and other aspects and advantages of the invention described herein will be better understood from the following detailed description of one or more preferred embodiments of the invention with reference to the drawings in which:

FIG. 5 is an illustration of the triangulation method.

DETAIL DESCRIPTION OF THE INVENTION

Figure 1:
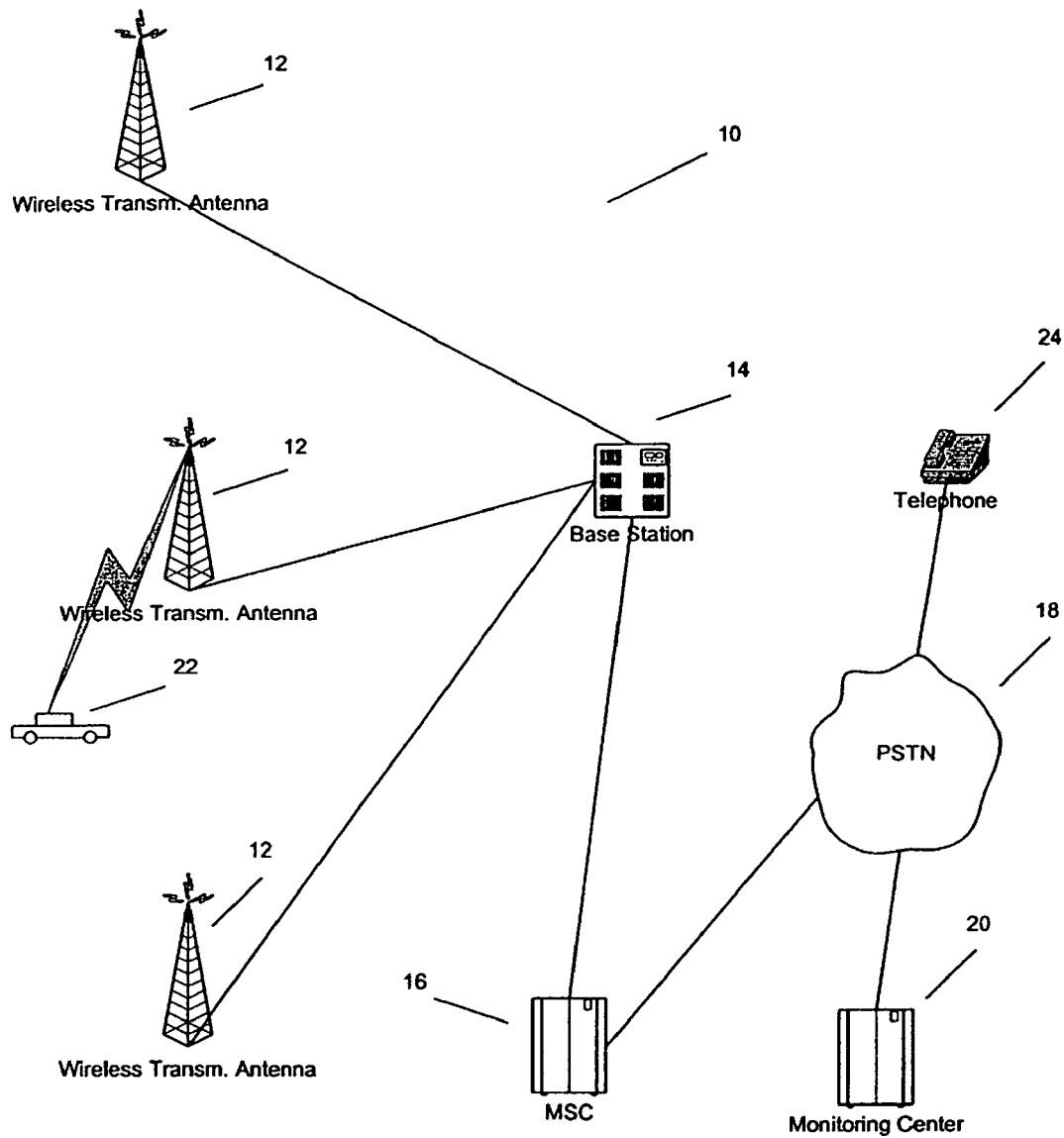
FIG. 1 depicts architecture of a wireless communication network.

Referring now in greater detail to the drawings, in which like numerals represent like components throughout several views, FIG. 1 depicts architecture of a wireless communication network 10. The wireless communication network 10 has a plurality of communication towers 12, also known as wireless transmission towers, connected to a base station (BS) 14. The wireless transmission towers 12 are distributed geographically to cover a wide area, and each tower 12 typically covers a "cell." A BS 14 may support one or more transmission towers 12 and are in communication with a MSC 16. A MSC 16 may support several BS' 14.

The MSC 16 performs call-processing function for the wireless communication system 10. The MSC 16 routes a call from a mobile device or a radiotelephone 22 to its destination. The call routing may be through a Public Switched Telephone Network (PSTN) 18. If an emitter is received by a transmission tower 12 and forwarded by a BS to the MSC 16. The MSC 16 routes the information through the PSTN to a 911 Dispatching Center or a Public Safety Answering Point (PSAP) 20.

Typically, an operator at PSAP 20 needs to know the location of the emitter in order to dispatch emergency service personnel to the location, if needed. Dispatching of emergency service vehicles may be delayed or impossible, unless the wireless communication network 10 is equipped with location finding devices.

A device installed on a wireless transmission tower 12 can provide information about the signal strength and the angle of arrival of a radioactive signal. The present invention employs a commercially available radioactive detection device.

Figure 2:
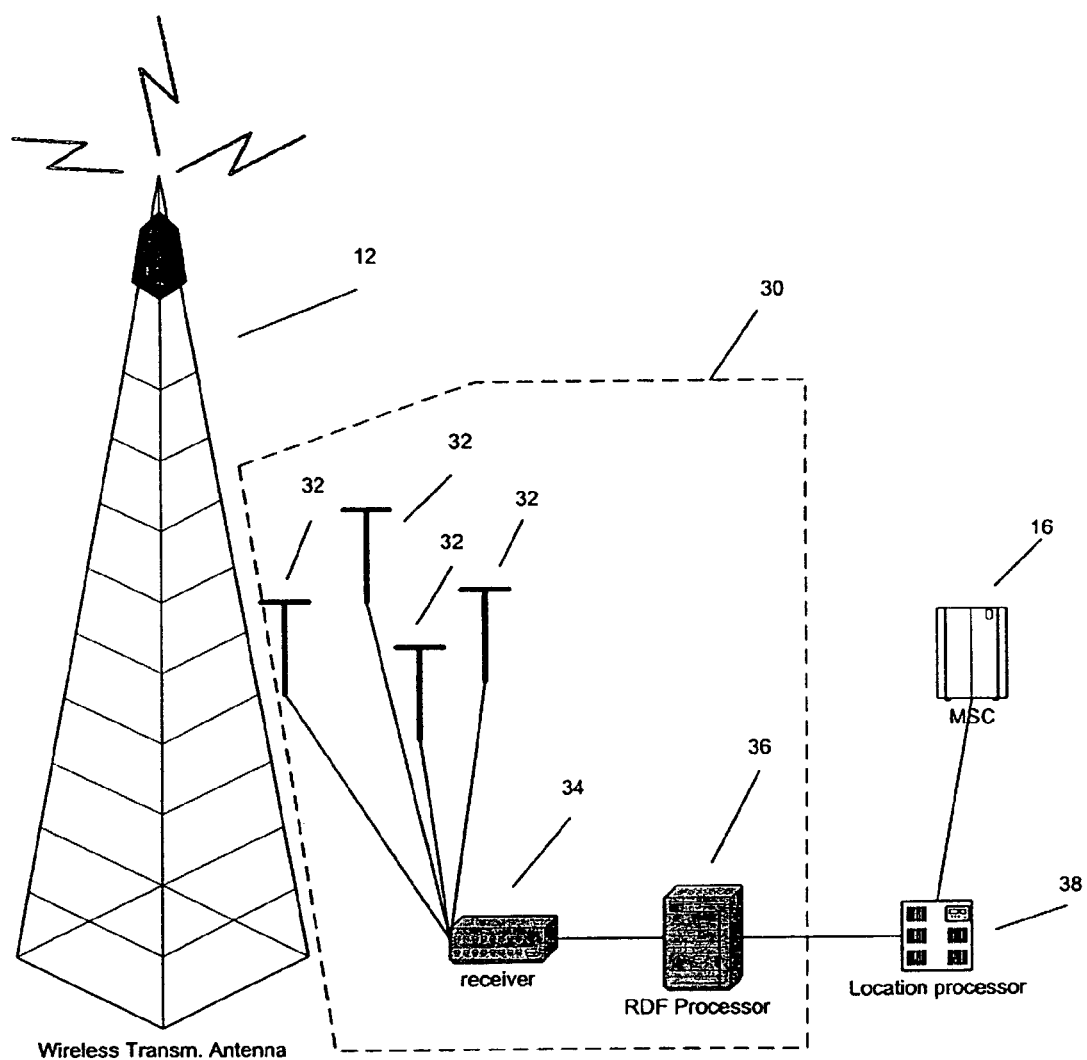
FIG. 2 depicts a sensor device installed on a wireless tower.

FIG. 2 is an illustration of a device 30 installed on a wireless transmission tower 12. Generally, one device 30 is installed to one wireless transmission tower 12. A device 30 typically has a set of sensors 32 connected to a receiver 34 and controlled by a processor 36. The device 30 tries to determine the angle of arrival of a radioactive signal by sequentially sampling the radioactive signals through each of the sensors 32 attached to the receiver 34. The receiver 34 samples the signals received before sending them to the processor 36 for processing. The processor 36 processes the signal received and attempts to determine the angle of arrival of the signal received. The processor 36 controls the sampling of radioactive signals by the sensors 32 and determines which radioactive type to sample.

In an alternate embodiment, the receiver 34 and the processor 36 may be enclosed in one physical unit, i.e., the receiver 34 and the processor 36 may be different circuits of a single device.

Generally, the processor 36 is in communication with a location processor 38. The location processor 38 preferably is connected to and receives information from multiple devices 30. The location processor 38 is also connected to a MSC 16. The location processor 38 receives radioactive signal information, such as radioactive type used (type of radiation), etc., about the notification from the MSC 16.

The location processor 38 transmits the radioactive signal information to multiple devices 30, so each device 30 can attempt to track this radioactive signal. It is preferred if the radioactive signal from an emitter can be tracked by more than one device 30. Each device 30 provides a unique angle of arrival information, which when combined with the information from other devices 30 allows calculation of the physical location of the transmitting device.

Figure 3:
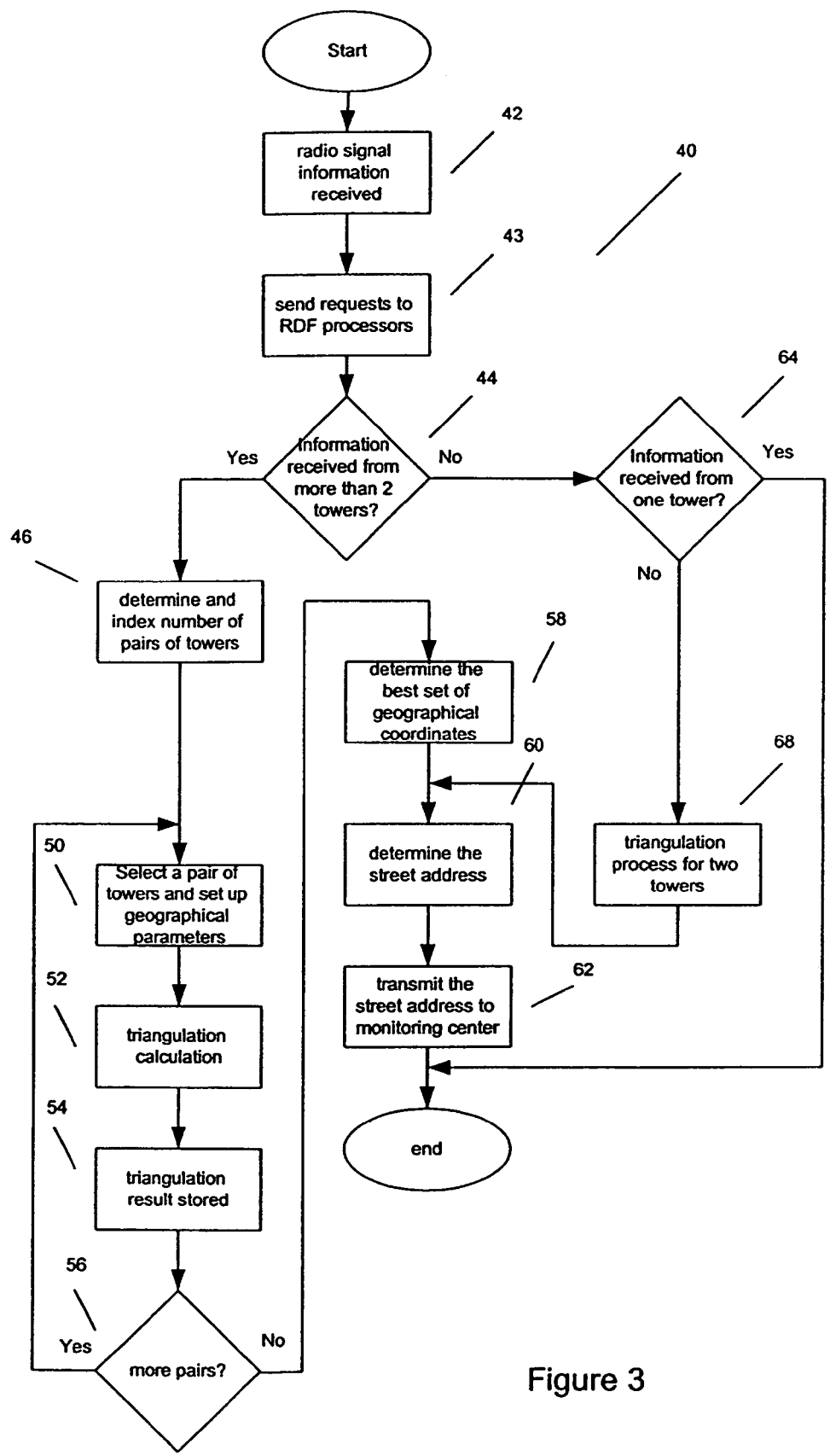
FIG. 3 is a block diagram for a location calculation process.

FIG. 3 is a block diagram of a location calculation process 40 performed by a location processor 38. The process starts when the location processor 38 receives from MSC 16 information about the radioactive signal of an emitter, block 42. The location processor 38 sends this information to devices 30 and requests the devices to scan for the radioactive signal of this emitter, block 43. Each device 30 scans for the radioactive signal and attempts to determine the signal strength and the angle of arrival of the radioactive signal. After determining the signal strength and the angle of arrival, the devices 30 send this information to a location processor 38.

When a location processor 38 receives information, it checks whether the information is from more than two devices 30, block 44, i.e., whether the radioactive signal has been "tracked" or "detected" by two or more wireless transmission towers 12. If more than two towers 12 receive the radioactive signal, they are paired and indexed, block 46. The towers 12 are paired because the calculation process, which uses a triangulation method, requires information from two towers. The towers are paired between them in such a way that three towers, A, B, and C will yield to three pairs of towers, AB, BC, and AC.

After the towers 12 are paired and indexed, the location processor 38 selects one pair for calculation, block 50. The geographical parameters of each tower are stored in a database accessible to the location processor 38. The geographical parameters include, but not limited to, longitude and latitude of each tower and the distance between the towers. The geographical parameters are used for the triangulation calculation, block 52.

After the calculation, the result is stored, block 54, and the location processor 38 checks whether there are more tower pairs to be calculated, block 56. If there are additional pairs, then blocks 50, 52, and 54 are repeated until all pairs are used for the calculation. The result of the triangulation calculation is a pair of geographical coordinates of the source of the radioactive signal, i.e., the source's longitude and latitude.

After all pairs have been used for the calculation and all results stored, the location processor 38 proceeds to select the "best fit" of geographical coordinates, block 58. The best fit of geographical coordinates may be determined by a simple average of coordinates or by a weighted average taking into account any obvious anomalies in location information. If one coordinate is far afield from the others, it may be due to an equipment malfunction and this should be considered and compensated. Other statistical models may also be used to determine the best fit.

The best fit is recorded, presumed to be accurate, and used to determine the street address. The best fit of geographical latitude and longitude is translated into street or highway addresses that are meaningful to the authorities at the PSAP, block 60. This translation may be performed employing commercially available software and database, such as MAPINFO.

Finally, the street address is transmitted back to the PSAP, block 62, together with other information associated with this data.

Back to block 44, if the information on the radioactive signal is not received by more than two towers, it is checked whether only one tower received the information, block 64. If only one tower received the information, then the triangulation method cannot be used and the location of the origin of the radioactive signal cannot be determined.

If two towers receive the information, then the triangulation method applies only to this pair of tower, block 68. The result of the triangulation calculation is used to determine the street address, block 60, and the street address is transmitted to the PSAP, block 62.

Figure 4:
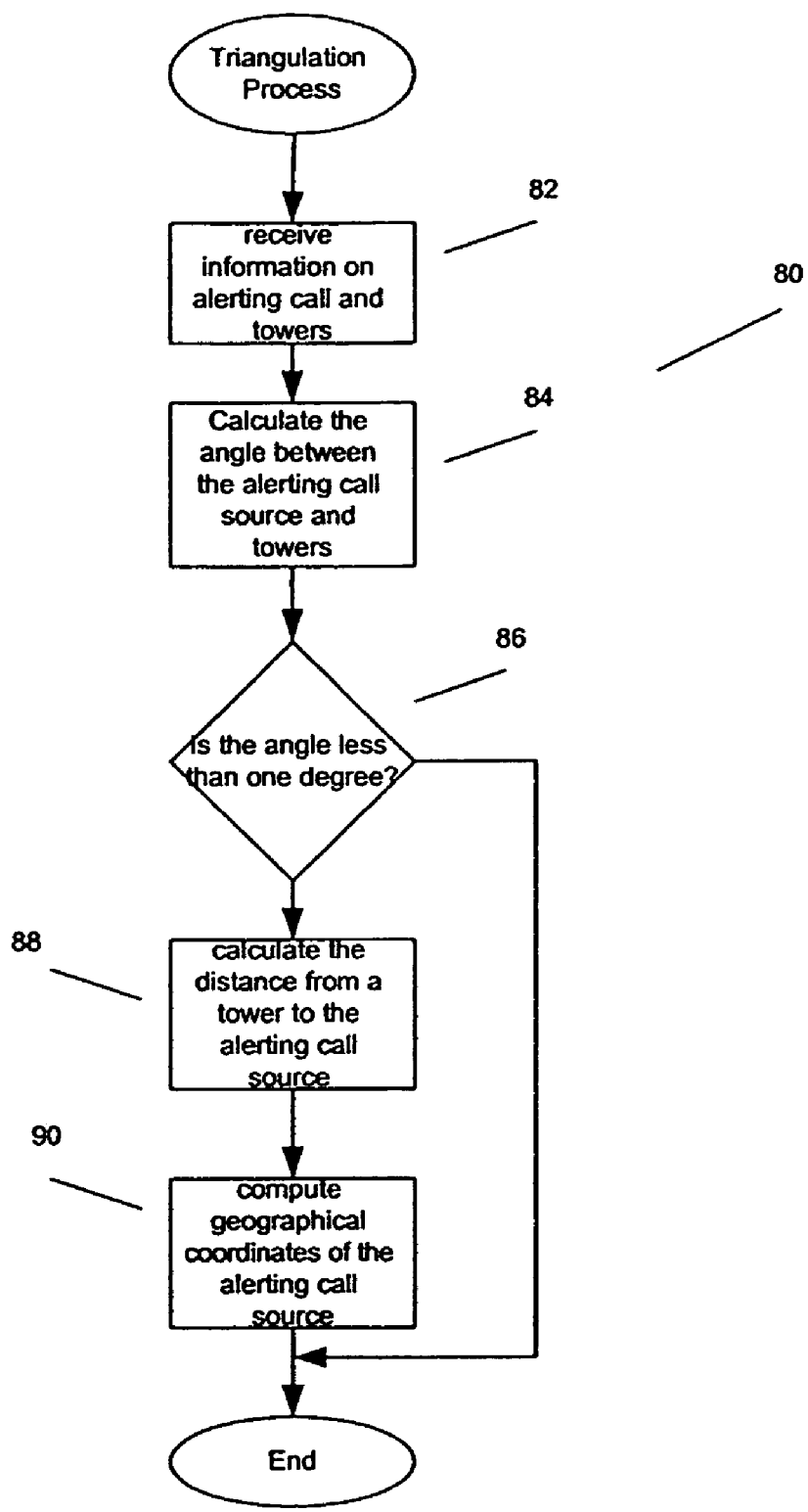
FIG. 4 is a block diagram for a triangulation calculation process.

FIG. 4 illustrates the triangulation calculation process 80. The process starts when the geographical parameters and information are received, block 82. The triangulation process calculates the angle between the source and the towers, block 84. A check is made to determine whether the angle calculated is less than one degree, block 86. If the angle is less than one degree, it means that the source lies on the line between two towers and the triangulation method will not give accurate results. If the angle is one degree or more, then the location processor 38 can determine the distance from one tower to the emitter source, block 88. Using the distance between a tower and the source, the location processor 38 can determine the geographical coordinates for the source, block 90.

FIG. 5 illustrates the triangulation method. The triangulation method assumes that the position of two points and the distance between them are known. The angular information about the third point is also known. The angular information is derived from the angle of arrival information provided by each device.

Equation 1 uses the distance between the two towers and the angular information from two devices to calculate distance v1, which is the distance from a first tower to point d1. d1 is a point demarked by a perpendicular line between the emitter source and the line connecting the two towers.

Equation 2 uses v1 to calculate the distance between the first tower and the emitter source.

After the distance between the first tower and the emitter source is calculated, the source's latitude and longitude can be easily determined using Equations 3 and 4.

In operation, when a radioactive signal is received from an emitter source, 22, the radiation is received by a wireless transmission tower 12, which is connected to a base station 14. The base station 14 forwards the information to a MSC 16, which attempts to route the data.

The MSC 16 routes the data to the PSAP 20 and sends a request to locate the emitter source to a location processor 38. The MSC also sends radioactive signal information to the location processor 38.

The location processor 38 sends the radioactive signal information to all devices 30. Generally, one device 30 is attached to each wireless transmission tower 12. The processor 36 of the device 30 sets-up the sensors 32 to tune-in to the radioactive signal and samples sequentially all the sensors 32. Each device 30 will return information on the angle of arrival of the radioactive signal, if it is successful in locating the radioactive signal. The device 30 sends the results back to the location processor 38.

The location processor 38 can determine the location of an emitter source if the location processor 38 receives the angle of arrival information from at least two devices 30. If the location processor 38 receives the information from more than two devices 30, then the location results can be analyzed and a "best fit" result selected.

The location processor 38 can easily translate the location information, which is expressed as longitude and latitude, into a street address through use of a commercial software or database. The street address is then transmitted to the MSC 16, which in turn sends it to the PSAP 20.

The foregoing description of preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application to enable others skilled in the art to utilize the invention and various embodiments and with various modifications as are suited to the particular use contemplated.

What is claimed is:

1. A method for determining the location of a radioactive device or chemical/biological hazardous material from which notification to a Public Safety Answering Point is made, the method comprising:

receiving radiation signal information related to an emitting source from a mobile switching center;

receiving a location request from a mobile switching center;

sending radioactive signal information to a plurality of radiation sensor devices;

receiving angular information from at least two radiation sensor devices;

employing a triangulation method to calculate the location of the radioactive device or chemical/biological hazardous material;

transmitting information about the location to the mobile switching center;

obtaining geographical location information for the wireless transmission towers associated with at least two radiation sensor devices, wherein the step of employing a triangulation method further comprises determining a best pair of geographical coordinates by averaging geographical coordinates.

* * * * *